United States Patent [19]

Sharps, Jr.

[11] Patent Number: 4,522,854
[45] Date of Patent: Jun. 11, 1985

[54] INTEGRAL FILM TEAR STRIP

[75] Inventor: Gordon V. Sharps, Jr., Fairport, N.Y.

[73] Assignee: Mobil Oil Corporation, New York, N.Y.

[21] Appl. No.: 469,859

[22] Filed: Feb. 28, 1983

[51] Int. Cl.³ ............................................. B32B 3/30
[52] U.S. Cl. ..................................... 428/43; 428/156; 428/167; 428/213; 206/620; 206/634
[58] Field of Search ................ 428/43, 156, 167, 213; 206/634, 620, 605

[56] References Cited

U.S. PATENT DOCUMENTS 3,034,941  5/1962  Hessenthaler et al. ............. 154/46
3,535,409  10/1970  Rohde ................................. 264/95
3,619,395  11/1971  Skendzic ............................ 264/171
3,812,002  5/1974  Lurie ................................. 428/43

Primary Examiner—Alexander S. Thomas
Attorney, Agent, or Firm—Alexander J. McKillop; Michael G. Gilman; Charles J. Speciale

[57] ABSTRACT

Disclosed is plastics film containing a tear strip and a method for producing it in which the film is co-extruded with a bead which adheres to the film surface. Because of the heat retained by the bead, blown expansion of the film following extrusion causes the film to undergo a gauge reduction along and adjacent to the bead which provides a preferential tear line for the film.

2 Claims, 4 Drawing Figures

4,522,854

INTEGRAL FILM TEAR STRIP

BACKGROUND OF THE INVENTION

1. Field of the Invention

The present invention relates to a film containing an integral tear strip and to a method for producing a tear strip for a plastic film during the manufacture of the film itself.

2. Discussion of the Prior Art

Prior attempts to provide preferential tear lines for plastic materials, particularly plastic films, have involved the steps of mechanically processing the material to provide perforations or score lines therein along which the material may easily separate. Providing weakened areas such as these requires additional processing of the film and additional equipment costs which naturally adds to the overall cost of film production. In addition, providing perforations in a material is an undesirable manner of introducing a weakness line since the material itself penetrates into the perforations and does not entirely provide an acceptable product.

Another method for providing a line of weakness in a plastics film is to laminate a material having substantially different properties to an underlying substrate material which has preferential tear properties in a predetermined direction. The material which is then laminated thereon is provided with a high relative strength in its longitudinal direction so that it may remain substantially intact. By pulling on the laminated material, it tears the substrate material. The difficulty with providing a tear line using this technique is that additional process steps are required to laminate additional materials on a substrate material so that the processing cannot be conveniently done in line during the manufacture of the underlying plastic substrate.

SUMMARY OF THE INVENTION

One object of the invention is the provision of a line of weakness in an extruded plastics material along which a tear can preferentially propagate, the line of material weakness being introduced during the manufacture of the plastics film and not requiring any additional post manufacturing processing steps.

An additional object of the invention is the provision of a method for forming a preferential tear line in an extruded plastics film which does not require extensive or complex equipment or processing steps, and which can be done in line with the manufacture of the film itself.

These and other objects, features and advantages of the invention will be more readily discerned from the following detailed description of the invention which is presented in connection with the accompanying drawings.

DETAILED DESCRIPTION OF THE INVENTION

In accordance with the invention, a plastics bead is coextruded with and on a surface of an extruded plastics film. The bead adheres to the plastics film and the heat retained by the bead causes a gauge reduction in the thickness of the plastics film during blown expansion of the film subsequent to extrusion. This gauge reduction forms a line of weakness along which the film will preferentially tear.

Figure 1:
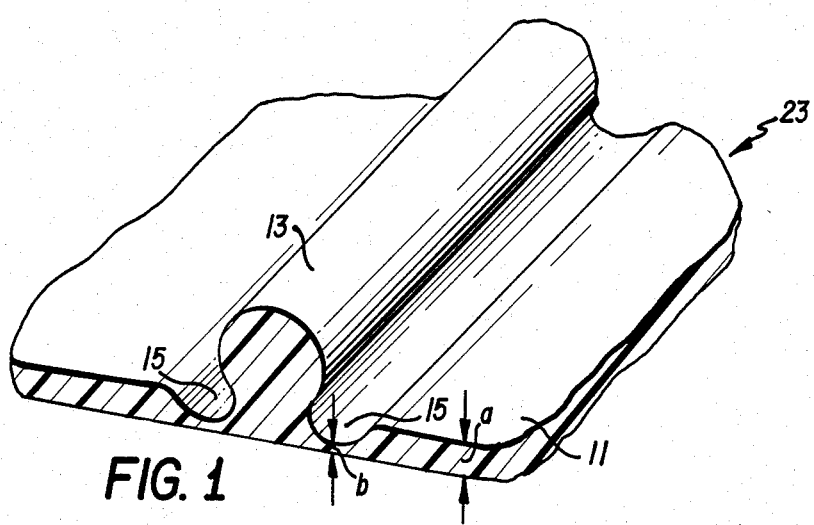
FIG. 1 illustrates a portion of a film produced in accordance with the teachings of the invention.

Turning to FIG. 1, a portion 11 of the wall of an extruded film 23 of the invention is shown containing thereon an integrally extruded bead 13. On opposite sides of bead 13 and extending along bead 13 are formed areas 15 of reduced film thickness. These are the areas along which the film 23 will preferentially tear.

Figure 2:
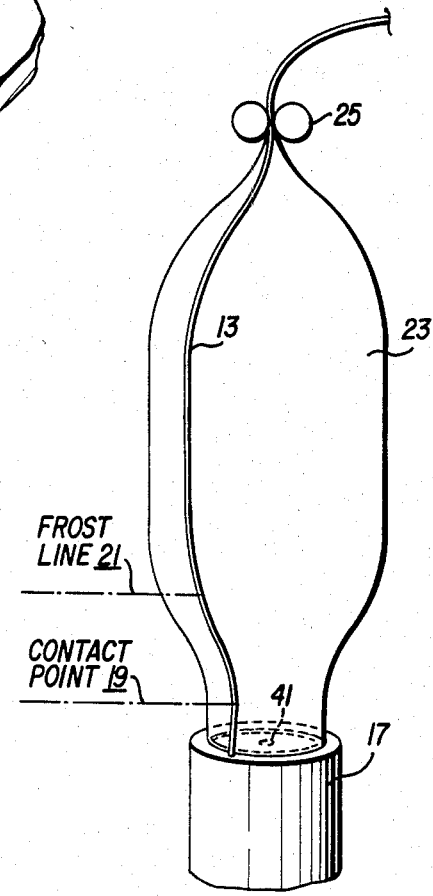
FIG. 2 illustrates the principal steps involved in the manufacture of the film illustrated in FIG. 1.

FIG. 2 illustrates the extrusion and blowing operations associated with producing the plastics film 23 shown in FIG. 1. In FIG. 2, a tubular extrusion die 17 is used to extrude the tubular film 23. Co-extruded with, and on the tubular film 23 is a bead 13. The bead 13 may be in contact with the film 23 as both exit the die 17, or the bead 13 may contact with the film 23 at a contact point spaced slightly above the exit orifice of die 17 and below the frost line 21.

After the bead 13 and film 23 have been coextruded, the film 23 is expanded below the frost line 21 of the film using known blown expansion techniques in which a pressurized gas exits orifice 41 which causes an expansion of the film in the transverse direction (TD) causing the areas 15 of the film adjacent bead 13 to undergo the thickness reduction shown in FIG. 1. During blown expansion the nominal thickness "a" of the film is reduced somewhat, but a greater thickness reduction occurs at the areas 15 to produce a film thickness "b" which is less than the nominal thickness "a". After blown expansion, the film 23 is collapsed by a pair of nip rollers 25 in conventional fashion.

Figure 3:
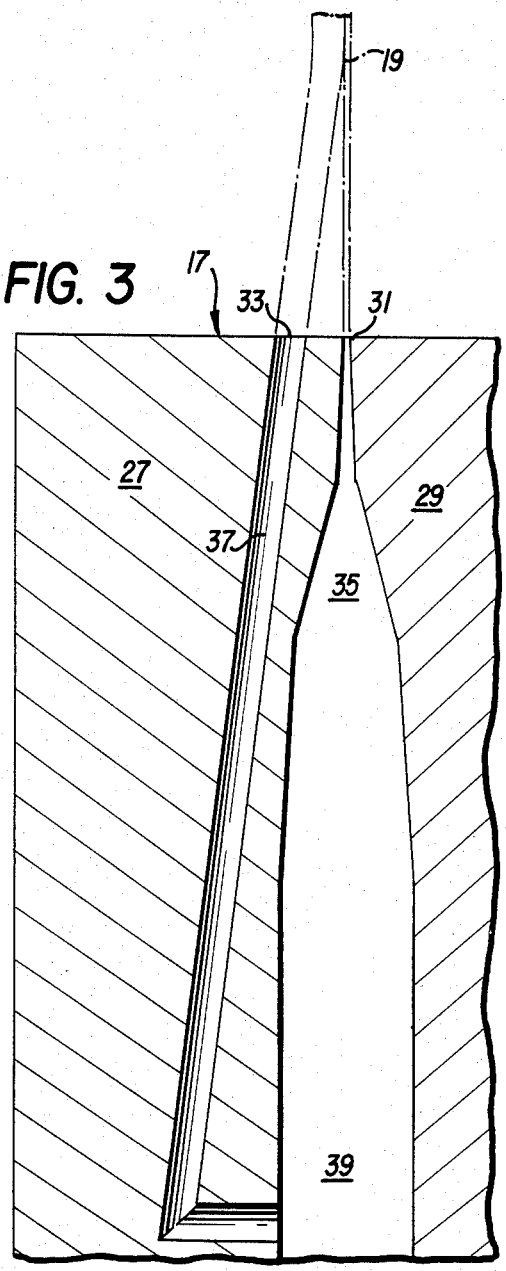
FIG. 3 illustrates a partial sectional view of the die illustrated in FIG. 2.
Figure 4:
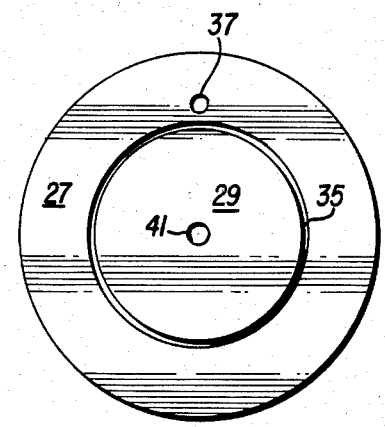
FIG. 4 illustrates a top view of the die illustrated in FIG. 2.

FIG. 3 illustrates a tubular die 17 which may be used in the method illustrated in FIG. 2. The tubular die includes an outer die wall 27 and an inner die wall 29 defining between them an annular flow passage 35 through which the plastics film 23 is extruded. The terminating end of annular flow passage 35 is the die orifice 31 through which the extruded plastics film exits the die.

The bead flow passage is illustrated as 37 in FIG. 3. Whereas the flow passage 35 for the film is annular the flow passage 37 is not, having a generally circular cross section which extends in an generally axial direction of the die. Flow passage 37 is inclined toward the die axis so that a bead exiting passage 37 at a die orifice 33 is directed towards the external surface of the film being extruded through annualar die orifice 31. The angling of the bead flow passage is such that contact of the bead with the extruded film occurs approximately 1" above the annular die orifice 31 and approximately 4" below the frost line of the film. (FIG. 2). The exit orifice 33 of the bead flow path 37 could also terminate directly adjacent annular die orifice 31 so that the bead 13 and film 23 are co-extruded and adhered at the time they both exit the die.

A common melt feed flow path 39 is shown in FIG. 3 for the bead flow passage 37 and annular film flow passage 35. Thus, with the die of FIG. 3 the same plastics melt is used to extrude both the film 23 and bead 13. Of course, if desired, a separate flow path could be provided for each of the annular flow passage 35 and the bead flow passage 37 to allow for co-extrusion of different melts.

A low density polyethylene has been extruded from the die illustrated in FIG. 3 having a 2 ½" diameter annular die orifice 31. The extrusion gap was machined to produce a 2 mm film thickness. The angling of the orifice toward the film path was made so that contact between the bead and film was made approximately 1" above the die orifice and approximately 4" below the frost line 21. The bead profile easily adhered to the film surface, but the increased mass of the bead 13 retained heat longer and thus took longer to cool, making areas 15 adjacent the bead hotter than other areas around the circumference of the blown film. As the film bubble was subsequently expanded, as shown in FIG. 2, to its final dimension, the plastics film 23 stretched preferentially in the local hot spots to reduce the gauge of the film from approximately 2 mm to approximately 0.5 mm in the areas 15 adjacent the bead profile. When the subsequently cooled film was torn, the tear easily propagated along the lines 15 of thin gauge.

Because the method as shown in FIG. 2 is integrated with the extrusion of the plastics film, no additional steps are required to provide a line of weakness in the film making the method of the invention easy to implement without requiring additional processing steps or machinery.

While one example of an extruded material has been described above, it should be apparent that the invention can be used with many different types of thermoplastics materials, for example, high and low density polyethylene, polypropylene, polystyrene and others.

While an embodiment of the invention in both its method and product aspects has been shown and described above, it should be apparent that many modifications can be made without departing from the spirit and scope of the invention. Accordingly, the invention is not limited by the foregoing description, but is only limited by the claims which are appended hereto.

I claim:

1. A plastic film comprising a layer of thermoplastic material and a thermoplastic bead extending along and integrally connected with said layer of thermoplastic material, said thermoplastic material having areas of reduced thickness extending along opposite sides of said bead to form lines of weakness for severing said plastic film.

2. A plastic film as in claim 1 wherein said bead has a substantially round cross-section.

* * * * *